United States Patent [19]

Kawai

[11] 4,416,427

[45] Nov. 22, 1983

[54] SPINNING REEL FOR FISHING

[75] Inventor: Hiroshi Kawai, Higashikurume, Japan

[73] Assignee: Daiwa Seiko Inc., Higashikurume, Japan

[21] Appl. No.: 175,895

[22] Filed: Aug. 6, 1980

[30] Foreign Application Priority Data

May 30, 1980 [JP] Japan .................................. 55-74940

[51] Int. Cl.³ ...................... A01K 89/01; A01K 89/02
[52] U.S. Cl. ................................ 242/84.2 R; 74/576; 188/82.4
[58] Field of Search ................... 242/84.5 A, 84.51 A, 242/84.5 R, 84.51 R, 84.21 R, 84.2 R, 82.4, 82.3, 82.43

[56] References Cited

U.S. PATENT DOCUMENTS

| 2,904,281 | 9/1959 | Jackson | 242/84.5 A |
|---|---|---|---|
| 3,027,114 | 3/1962 | Grieten | 242/84.5 R |
| 3,510,083 | 5/1970 | Cook | 242/84.51 R |
| 3,697,011 | 10/1972 | Christensen et al. | 242/84.2 A |
| 3,796,395 | 3/1974 | Rankin, Jr. | 242/84.5 R |
| 3,989,204 | 11/1976 | Lemery | 242/84.5 R |

FOREIGN PATENT DOCUMENTS 578871  7/1959  Canada .......................... 242/84.5 A Primary Examiner—Billy S. Taylor
Attorney, Agent, or Firm—Browdy and Neimark

[57] ABSTRACT

A fishing spinning reel of a type having a housing and rotatably carrying a rotary shaft having a handle, a rotor mounted on a front part of the housing and including a bail arm for retaining the fishing line for rotation with the rotary shaft, and a spool provided at the end of the rotor, includes a sleeve member having a flange formed at a front part of the housing so as to project into a recess formed in a rear part of the rotor, and a braking disc clamped by a braking member fitted to the portion of the sleeve behind the flange. A one-way engaging mechanism is interposed between the braking disc and the rotor to keep these members away from each other when the rotor is being rotated in the forward direction and to make these members engage with each other when the rotor is being rotated in the backward direction. A leaf spring provided at the rear side of the braking member is adapted to be pressed by a manipulation arm mounted on the housing and extending in the axial direction of the spool.

6 Claims, 14 Drawing Figures

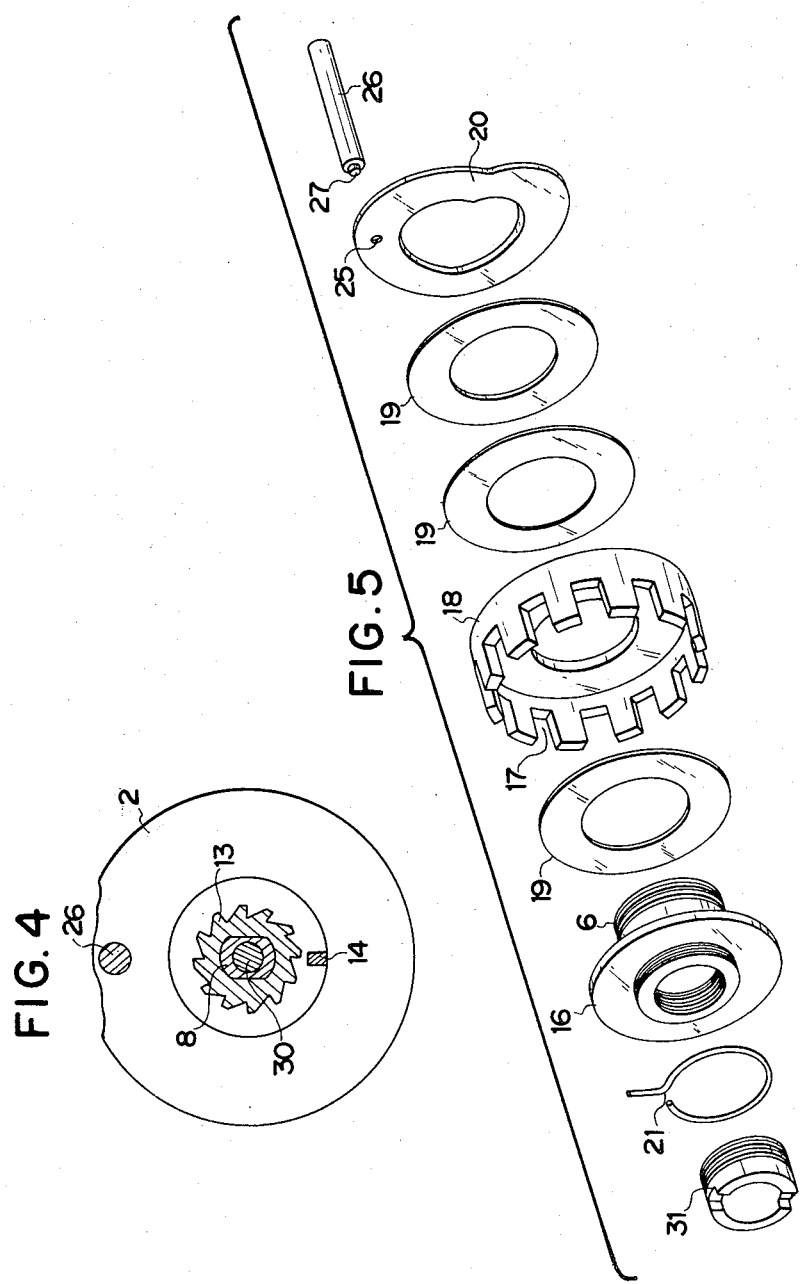

SPINNING REEL FOR FISHING

BACKGROUND OF THE INVENTION

The present invention relates to a spinning reel for fishing and, more particularly, to an improvement in the drag mechanism for controlling the playing out of the fishing line.

Generally, a spinning reel is provided at the front part of the spool thereof with a drag mechanism which is adapted to control the playing out of the fishing line due to reversing of the spool in accordance with the pulling force of the fish.

This drag mechanism mounted on the spool, however, poses problems that the fishing line is twisted and that the adjustment of the braking force of the drag mechanism cannot be made during the taking up of the fishing line.

In order to overcome these problems, it has been proposed to mount the drag mechanism at a rear part of the rotor, as shown in Japanese Utility Model Laid-open No. 132888/1977. However, the adjustment of the braking force can hardly be made during the taking up of the fishing line, because the manipulation knob of the drag mechanism is rotated during operation of the drag mechanism. In addition, the drag mechanism including braking disc, braking member, manipulation knob and so forth is rotated as a unit with the rotor to impart an unnecessarily large inertia to the rotor to hinder the swift manipulation of the handle. In addition, since the manipulation knob has to be installed between the housing and the rotor, the length of the reel in the axial direction of the spool is increased resulting not only in the increase of the size of reel but also in a rough adjusting operation.

SUMMARY OF THE INVENTION

It is, therefore, a major object of the invention to provide a spinning reel which eliminates the above-described problems in the conventional rotor drag type mechanism.

More specifically, it is a first object of the invention to provide a drag adjusting mechanism which eliminates the twisting of the fishing line during playing out and which permits the braking force of the drag mechanism to be freely adjusted during taking up, as well as during playing out.

It is a second object of the invention to provide a spinning reel in which the drag mechanism is of a one-way engagement type which engages the rotor only when the latter is being reversed, i.e. only during the playing out of the fishing line, to make rotation unitary with the rotor to control the playing out of the fishing roll, while, when the rotor is being rotated in the forward direction, i.e. when the fishing line is being taken up, the drag mechanism is separated from the rotor so that the unnecessary inertia is not imparted by the drag mechanism by the rotor, to ensure a prompt and smooth operation of the handle.

It is a third object of the invention to provide a spinning reel in which the adjustment of the braking force drag mechanism is made at the rear part of the housing where the manipulation is made most easily, thereby to facilitate the adjustment and to afford a fine or minute adjustment, and in which the drag mechanism is interposed between the rotor and the housing to prevent the size of the reel from becoming unduly large and to ensure a compact construction of the reel.

It is a further object of the invention to provide a spinning reel in which the one-way engaging mechanism for making the drag mechanism engage with the rotor includes engaging claws attached to the lower face of the rotor for causing the rotor to engage with the braking disc, while the braking disc is provided with the engaging claws. This arrangement eliminates the necessity of renewing the rotor after wearing out of the engaging mechanism. Namely, the mechanism becomes operative merely by renewing the braking disc and the engaging claws. Furthermore, the danger of damaging of the surface coating of the rotor, which is made by die casting from aluminum alloy, magnesium alloy and the like, is completely eliminated.

These and other objects, as well as advantageous features of the invention will become clear from the following description of the preferred embodiments taken in conjunction with the accompanying drawings.

BRIEF DESCRIPTION OF THE DRAWINGS

FIG. 4 is a vertical sectional front elevational view taken along the line B—B of FIG. 1;

FIG. 5 is an exploded perspective view of an essential part of the spinning reel of the embodiment shown in FIG. 1;

DESCRIPTION OF THE PREFERRED EMBODIMENTS

Figure 1:
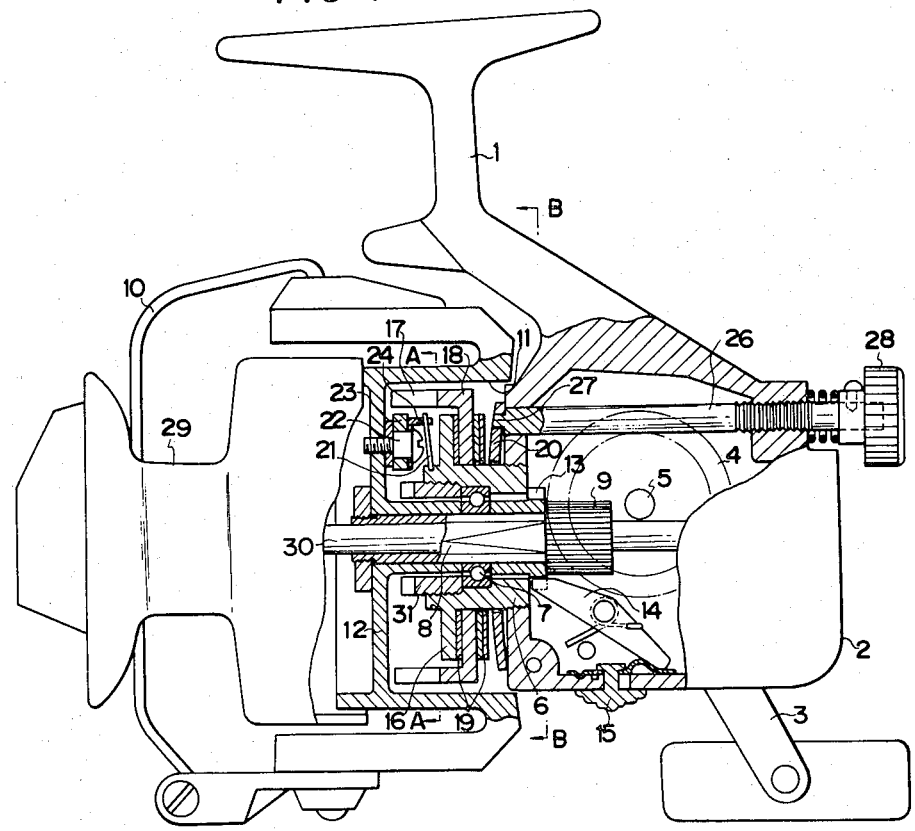
FIG. 1 is a partly removed side elevational view of an embodiment of the invention.
Figure 2:
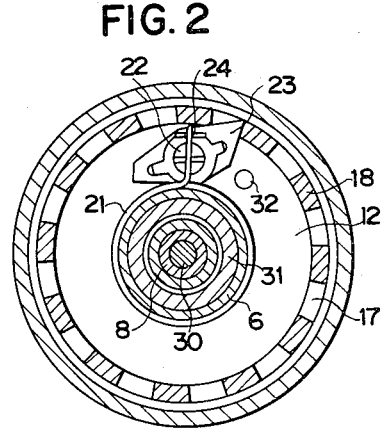
FIG. 2 is a vertical sectional front elevational view of the spinning reel taken along the line A—A in FIG. 1 in the state of playing out of the fishing line.

Referring first to FIGS. 1 to 5 showing an embodiment of the invention, a housing 2 is provided at its upper side with a fixing member 1 for fixing the housing 2 to a fishing rod and at its substantially mid portion with a rotary shaft 5 provided with a handle 3 and a master gear 4 as is well known. Also, a rotary shaft sleeve 8 is rotatably supported through a medium of a bearing 7 in a sleeve 6 projected from the front end of the housing 2. A pinion 9 provided at the rear end of the shaft sleeve 9 engages with the master gear 4. A rotor 12 having a bail arm 10 and provided at its rear end with a recess 11 is fixed to the front end portion of the shaft sleeve 8 for a rotation unitarily therewith.

An anti-reversing ratchet wheel 13 is fixed to the shaft sleeve 8 at the front side of the pinion 9 for rotation unitarily with the shaft sleeve 8. A ratchet pawl 14 pivotally secured to the inside of the housing 2 is adapted to be brought into and out of engagement with the ratchet wheel 13 by a manipulation of a manipulation knob 15. The arrangement is such that the rotor 12 is prevented from being reversed as the pawl 14 is brought into engagement with the anti-reversing ratchet wheel 13.

A flange 16 is formed unitarily with the sleeve 6 at a portion of the latter slightly behind the front end thereof. A braking disc 18 provided at its bent peripheral portion with an engaging notch 17 is fitted to the portion of the sleeve 6 behind the flange 16, and is clamped from its both sides by friction members 19,19 such as of washers, leather gaskets or the like. A ring-shaped leaf spring 20 is fitted to the rear side of the friction members 19,19.

A coiled spring 21 is wound round the portion of the sleeve 6 ahead of the flange 16. The coiled spring 21 has a bent end which engages an engaging groove 24 formed in the upper face of an engaging claw 23 which is pivoted to the bottom of the rotor 12 by means of a pin 22. The position of the engaging groove 24 is so selected that the coiled spring 21 biases the engaging claw 23 into engagement with the engaging notch 17 when the rotor 12 rotates the playing out direction (clockwise direction), whereas, when the rotor 12 is rotated in the taking up direction (counter clockwise direction), the engaging claw 23 is moved away from the engaging notch 17.

An engaging hole 25 is formed in the upper portion of the ring-shaped leaf spring 20. The engaging hole 25 receives a projection 27 formed at the end of a manipulation rod 26 which is screwed to an upper part of the housing 2 for free forward and backward screwing movement. As a knob 28 on the end of the manipulation rod 26 is rotated, the pressure of contact of the leaf spring 20 to the friction member 19 is freely adjusted.

A spool shaft 30 carrying a spool 29 is received by the rotary shaft sleeve 8 for back and forth movement in the axial direction together with the rotary shaft 5 in a manner known per se. A ring 31 for holding the bearing 7 is screwed to the inside of front end of the sleeve 6.

A stopper 32 for engaging the claw 23 is provided on the bottom surface of the rotor.

Figure 3:
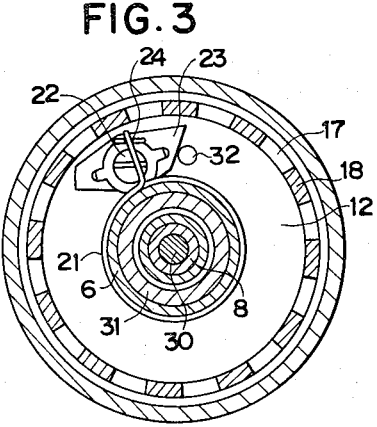
FIG. 3 is a vertical sectional front elevational view of the spinning reel taken along the line A—A in FIG. 1 in the state of taking up of the fishing line.
Figure 6:
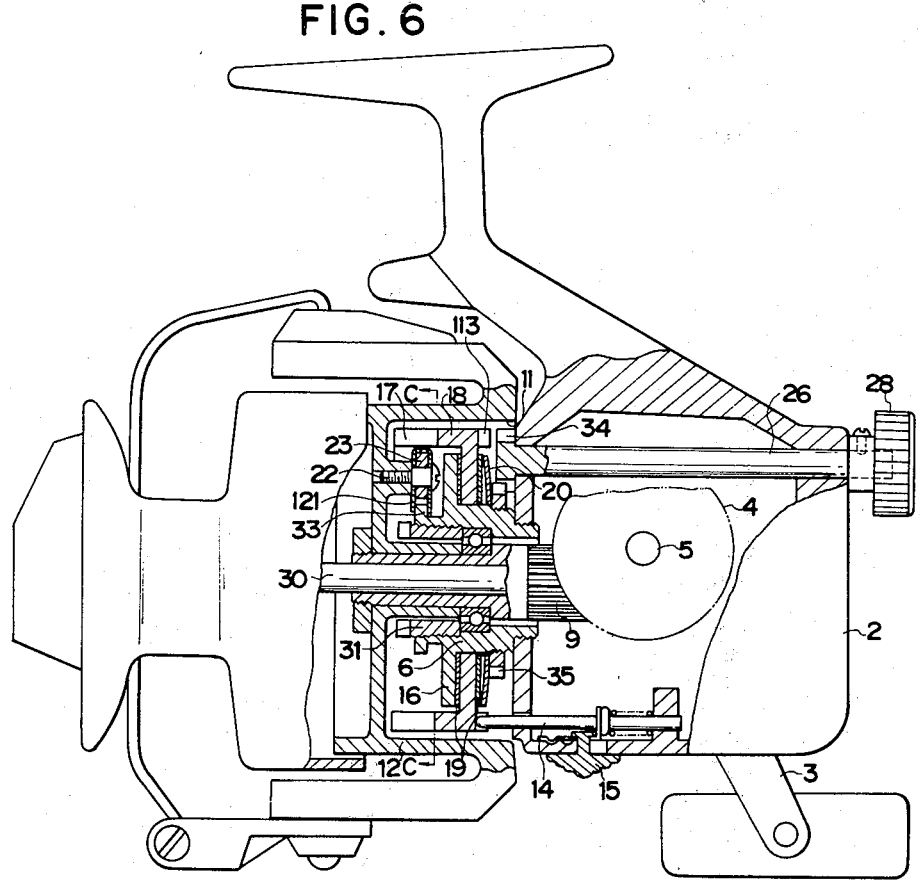
FIG. 6 is a partly removed side elevational view of another embodiment of the invention.
Figure 7:
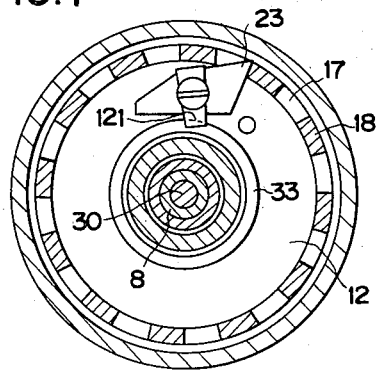
FIG. 7 is a vertical sectional view of the spinning reel taken along the line C—C of FIG. 6, in the state of playing out of the fishing line.
Figure 8:
FIG. 8 is a perspective view of an essential part.
Figure 9:
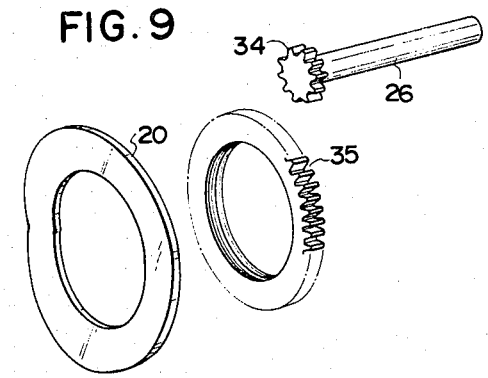
FIG. 9 is an exploded perspective view of constituents of the essential part.

In this embodiment, therefore, as the rotor 12 is rotated in the taking up direction (counter-clockwise direction) by a rotation of the handle 3 through the action of the rotary shaft 5, master gear 4, pinion 9 and the rotary shaft sleeve 8, the engaging claw 23 is rotatively biased by the coiled spring 21 away from the engaging notch 17 of the braking disc 18 as illustrated in FIG. 3, so that the rotor 12 is separated from the braking disc 18 and allowed to rotate to take up the fishing line on the spool 29.

To the contrary, as the fishing line is pulled by the fish and played out to cause a reversing (clockwise) rotation of the rotor 12, the coiled spring 21 brings the engaging claw 23 into engagement with the engaging notch 17 of the braking disc 18 so that the rotor 12 is reversed integrally with the braking disc 18 which is frictionally braked by the friction braking member 19. In consequence, the rotation of the rotor 12 is braked.

The braking force can be adjusted by moving the manipulation rod 26 back and forth by means of the manipulation knob 28 thereby to adjust the pressurizing force of the leaf spring 20.

As embodiment shown in FIGS. 6 to 9 has a different construction of the one-way engagement of the braking disc 18 with the rotor 12. Namely, in this embodiment, a substantially U-shaped leaf spring is fixed to the engaging claw 23 so as to clamp the latter. The ends of the leaf spring 121 clamps therebetween a peripheral edge 33 formed at a portion of the sleeve 6 ahead of the flange 16. This leaf spring 121 is adapted to move the engaging claw 23 away from the engaging notch 17 of the braking disc 18 when the rotor 12 is rotating in the forward direction (taking up direction) and to bring the engaging claw 23 into engagement with the engaging notch 17 during reversing (playing out direction) of the rotor 12.

In this embodiment, a pinion 34 is fixed to the end of the manipulation rod 26 rotatively carried by the upper part of the housing 2 and is engaged by a gear 35 which is screwed to the sleeve 6 for back and forth screwing movement, the gear being adapted to press the leaf spring 20, so that the braking force of the drag mechanism can be minutely adjusted.

In this embodiment, furthermore, the anti-reversing mechanism of the first embodiment constituted by the ratchet wheel provided on the rotary shaft sleeve 8 is substituted by a combination of teeth 113 formed on the periphery of rear side of the braking disc 18 and a ratchet wheel 14 having a manipulation knob 15 and disengageably engaging the teeth 113 so as to prevent the rotator 12 from rotating in the reverse direction.

Figure 10:
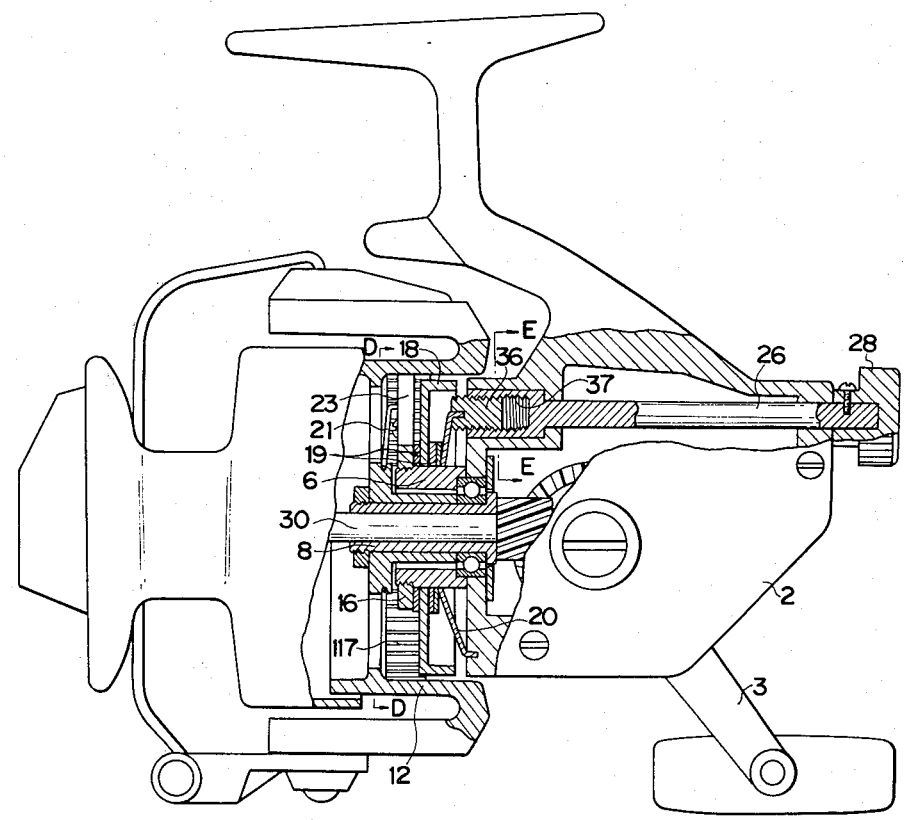
FIG. 10 is a partly removed side elevational view of still another embodiment of the invention.
Figure 11:
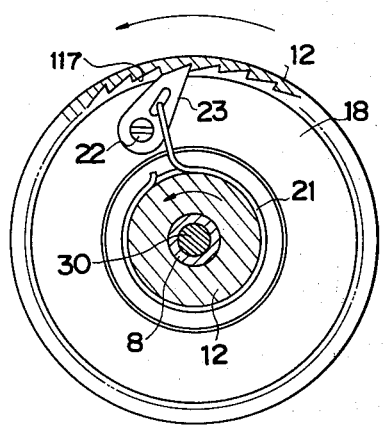
FIG. 11 is a vertical sectional front elevational view taken along the line D—D of FIG. 10, in the state of playing out of the fishing line.
Figure 12:
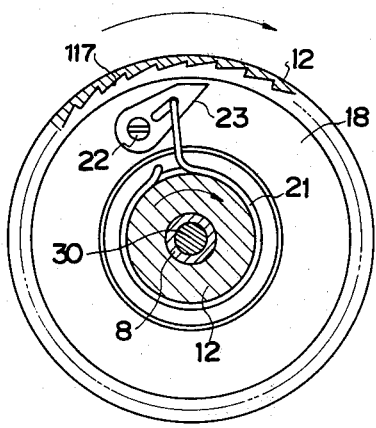
FIG. 12 is a vertical sectional front elevational view taken along the line D—D of FIG. 10, in the state of taking out of fishing line.
Figure 13:
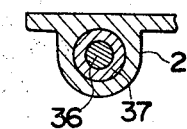
FIG. 13 is a vertical sectional front elevational view taken along the line E—E of FIG. 10.
Figure 14:
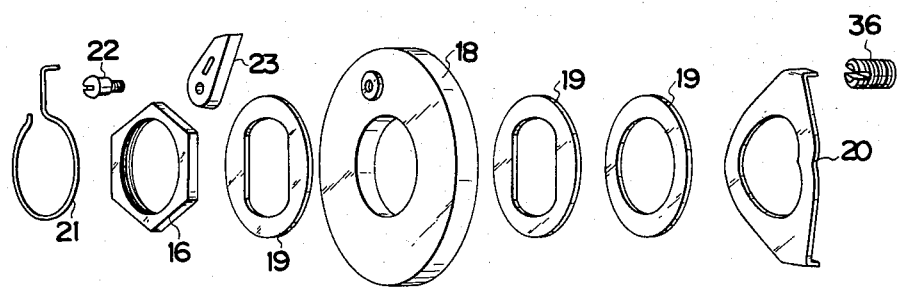
FIG. 14 is an exploded perspective view of constituents of an essential part.

FIGS. 10 to 11 show still another embodiment in which the one-way engagement of the braking disc 18 with the rotor 12 is achieved by the following arrangement. An engaging claw 23 is pivotally secured to the braking disc 18 by means of a pin 22 and is adapted to be biased in the same direction as the rotation of the rotor 12 by means of the coiled spring 21. At the same time, saw-teeth 117 adapted to be engaged by the engaging claw 117 are formed on the inner peripheral surface of the recess 11 so that the braking disc 18 is engaged by the rotor 12 only during reversing of the latter.

In this embodiment, a screw sleeve 36 is provided at the upper part of the leaf spring 20 pressing the braking member 19 and is engaged by the female screw 37 formed in the end of the manipulation rod 26 rotatably supported by the housing 2. As the manipulation rod 26 is rotated, the screw sleeve 36 is moved back and forth to adjust the pressure with which the leaf spring 20 contacts the braking member 19.

What is claimed is:

1. In a spinning reel for fishing including a housing provided at its upper part with an attaching member for attaching said housing to a fishing rod and carrying a rotary shaft having a handle; a rotor rotatably mounted on the front part of said housing and having a bail arm for retaining the fishing line, said rotor being adapted to be rotated in accordance with the rotation of said rotary shaft; and a spool provided at the front end of said rotor and adapted to make reciprocating motion in the axial direction in accordance with rotation of said rotary shaft, an improvement which comprises: a sleeve having a bent peripheral flange and formed at a front part of said housing so as to project into a recess formed in the rear part of said rotor; a braking disc fitted to a portion of said sleeve behind said sleeve and clamped by a frictioning braking member; a one-way engaging mechanism interposed between said braking disc and said rotor and adapted to disengage said braking disc from said rotor when said rotor is rotating in the forward direction and to make said braking disc and said rotor when said rotor is rotating in the backward direction; a leaf spring provided at the rear end of said frictioning braking member; and a manipulation rod mounted on said housing and extending in the axial direction of said spool, said manipulation rod being adapted to press said leaf spring.

2. A spinning reel for fishing as claimed in claim 1, wherein said one-way engaging mechanism includes an engaging notch formed in the bent peripheral portion and an engaging claw pivotally secured to the bottom of a recess formed in said rotor and biased by a spring so as to engage said engaging notch when said rotor is rotated in the backward direction.

3. A spinning reel for fishing as claimed in claim 1, wherein said one-way engaging mechanism includes an engaging saw teeth formed on the inner peripheral surface of a recess formed in said rotor and an engaging claw pivotally secured to said braking disc and biased by a spring so as to engage said saw teeth when said rotor is rotated in the backward direction.

4. A spinning reel for fishing as claimed in claim 1, wherein a manipulation rod screwed for back and forth movement to said housing is secured to the upper end of a leaf spring pressing said frictioning braking member.

5. A spinning reel for fishing as claimed in claim 1, wherein a gear screwed to a sleeve projected from said housing is kept in contact with the rear side of said leaf spring pressing said frictioning braking member, said gear being engaged by a pinion fixed to the end of said manipulation rod rotatably mounted on said housing.

6. A spinning reel for fishing as claimed in claim 1, wherein a screw sleeve is fixed to an upper part of said leaf spring pressing said frictioning braking member and screwed to a femal screw thread bore formed in the end of said manipulation rod rotatably mounted on said housing.

* * * * *